United States Patent [19]
Vetter

[11] Patent Number: 5,255,551
[45] Date of Patent: Oct. 26, 1993

[54] PRECIOUS METAL WIRE DRAWING MACHINE AND METHOD

[76] Inventor: Dennis Vetter, 6644 S. 196th Pl., T-104, Kent, Wash. 98032-2124

[21] Appl. No.: 905,430

[22] Filed: Jun. 29, 1992

[51] Int. Cl.⁵ ............................................. B21C 1/30
[52] U.S. Cl. ....................................... 72/290; 72/291
[58] Field of Search ............... 72/290, 291, 287, 282, 72/278, 284, 274

[56] References Cited

U.S. PATENT DOCUMENTS

| | | | |
|---|---|---|---|
| 195,731 | 10/1877 | Tasker | 72/291 |
| 323,619 | 8/1985 | Allderdice | 72/291 |
| 4,383,429 | 5/1983 | Ceccacci | 72/467 |

FOREIGN PATENT DOCUMENTS

| | | | |
|---|---|---|---|
| 50288 | 1/1890 | Fed. Rep. of Germany | 72/290 |
| 428980 | 5/1926 | Fed. Rep. of Germany | 72/290 |
| 3211171 | 7/1983 | Fed. Rep. of Germany | 72/274 |
| 461395 | 12/1913 | France | 72/290 |
| 536780 | of 1895 | United Kingdom | 72/287 |

*Primary Examiner*—Daniel C. Crane
*Attorney, Agent, or Firm*—David L. Tingey

[57] ABSTRACT

A motorized wire-drawing machine for manufacturing precious metal wire. A clasp plate is slidably supported by two support rods extending from the draw plate support block to a motor support block. Mounted parallel to the support rods and passing through a threaded hole in the clasp plate with threads matching the threaded rod is a threaded rod. Thus, when the threaded rod is rotated, the clasp plate moves longitudinally on the support rods and the threaded rod. The threaded rod passes through a hole in the motor support block to a motor drive shaft, connected to the shaft by means of an adjustable shaft that drives the threaded rod under normal resistive load from the wire but slides, disengaging the motor from the threaded rod, during high resistive loads. The clutch is adjustable to accommodate wire of various sizes and materials.

8 Claims, 3 Drawing Sheets

PRECIOUS METAL WIRE DRAWING MACHINE AND METHOD

This invention relates to machines for the manufacture of wire, and more specifically to a machine that makes wire from precious metals.

BACKGROUND OF THE INVENTION

A gold or silversmith generally begins the process of forming wire by casting a 2-inch long cylindrical ingot of metal about ½-inch in diameter. The ingot is then rolled to a nearly square cross section of about ⅛-inch across the flats. This slender metal bar is then drawn through a draw plate several times each time with successively decreasing diameter holes until a wire of the desired size is obtained. During the drawing process, the wire is annealed several times and lubricated with wax before being pulled through the drawplate.

It is known in the art to have machines that make wire of gold or silver. Typically, the previous machines have been large and expensive and therefore not economically available to the small-business craftsman nor able to be stored in small quarters in which these craftsmen often work. It is therefore the more common practice for craftsmen to draw the precious metal through a draw plate by hand, requiring considerable muscular effort. To draw metal by hand, these craftsman need to purchase metal stock in sizes that allow them to pull the stock through a draw plate, foregoing the option of using scrap material.

The present invention provides a machine that is comparatively small so that it can be accommodated in a jeweler's small business area. It is designed to be simple and cost-effective to be affordable to the small business craftsman. It is motorized to facilitate operation yet retains the advantages of hand drawing. That is, it clamps to the metal being drawn through the draw plate with adjustable force on the grasping mechanism; the draw plate is securely held during drawing, but easily repositioned for subsequent draws through successively smaller hole; and, the machine is compact and so easily stored in small areas.

It is then the object of this invention to provide a machine for drawing precious metals into wire that is compact and affordable to the small-business craftsman.

It is a further object that the machine be motorized for ease of use, but retain the simplicity and advantages of drawing wire by hand.

It is still another object that the motor attachment be provided with a release mechanism so that when tension on the wire reaches a predefined limit, the motor is disengaged.

It is yet another object that the machine provide a adjustable mechanism for grasping the metal for drawing through the plate for use with metals of varying hardness and size.

It is still another object that the machine operate at gradually adjustable speed.

It is a final object that the draw plate be adjustably mounted on the machine to facilitate alignment through several successive draws of wire through the plate.

BRIEF DESCRIPTION OF THE DRAWINGS

FIG. 4 is a perspective view of the clasp plate with adjustable wire-clasping mechanism, and support and threaded rods passing through.

SUMMARY OF THE INVENTION

Figure 1:
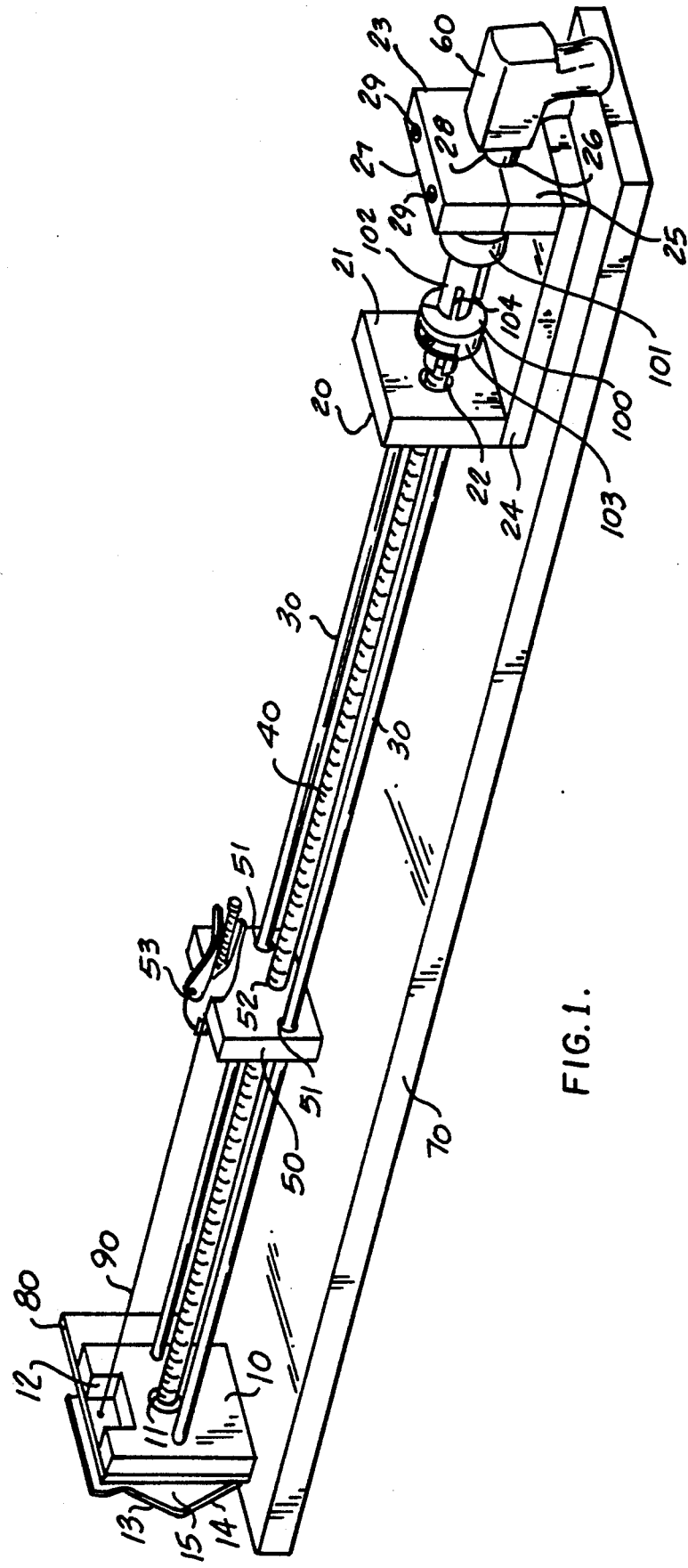
FIG. 1 is a top perspective view of the machine showing a wire secured in the machine and being drawn through a draw plate.
Figure 2:
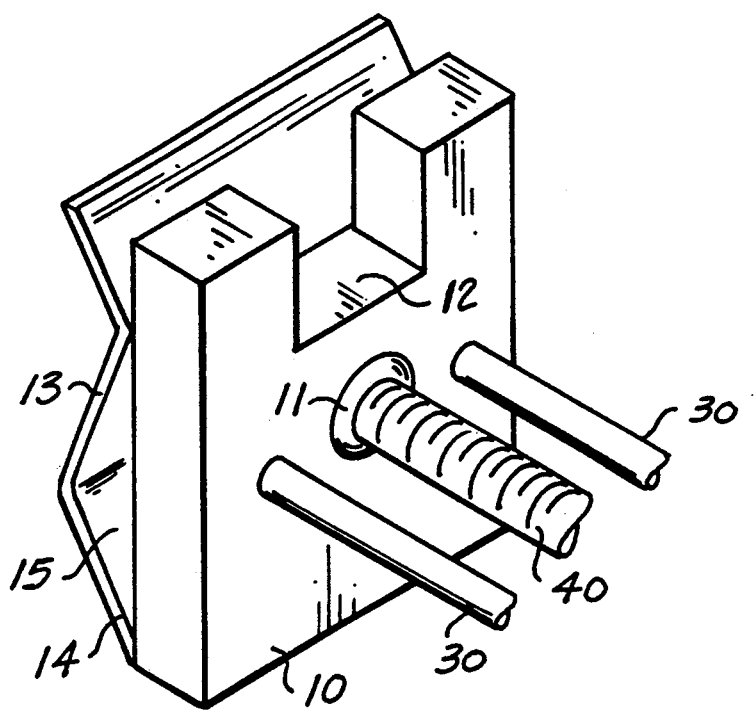
FIG. 2 is a perspective view of the plate end of the machine.
Figure 4:
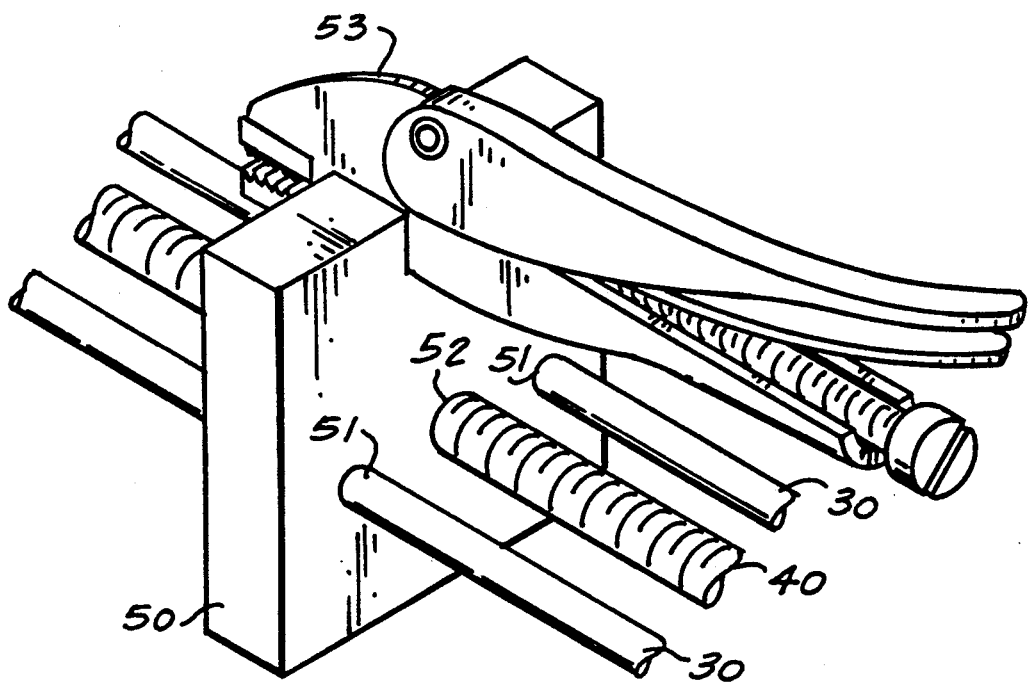
Figure 3:
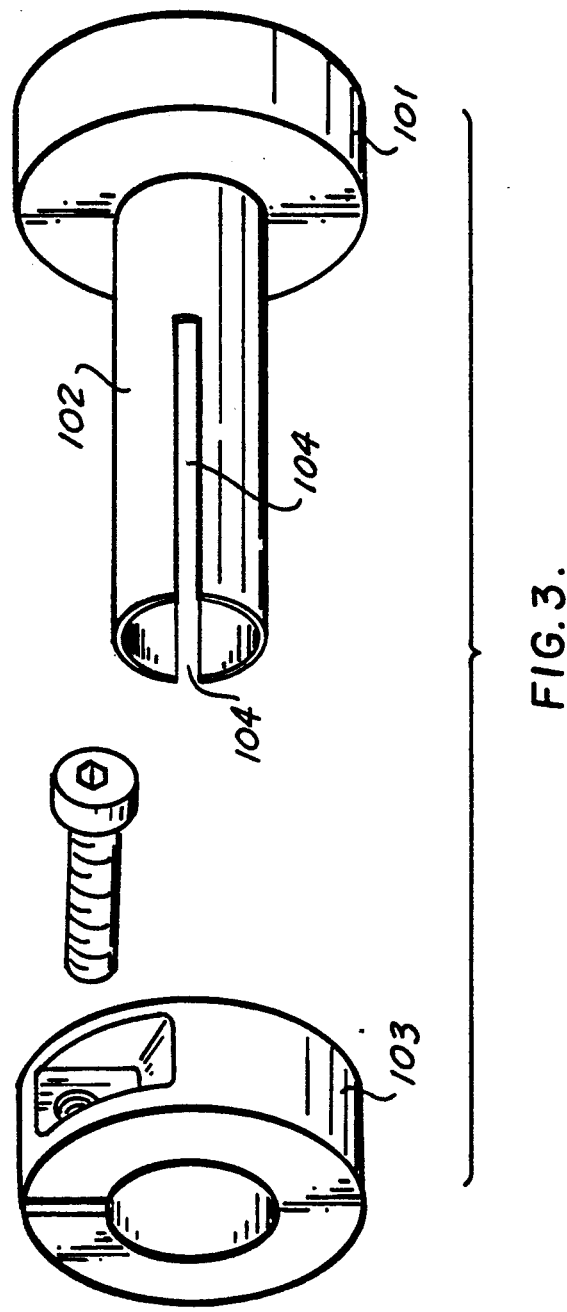
FIG. 3 is a perspective view of the adjustable clutch.

A motorized wire-drawing machine for manufacturing precious metal wire is described. The machine receives and secures a wire drawing plate to a drawing plate support block. Wire stock is then passes from the drawing plate to a clasp on a clasp plate where it is secured to the machine. The clasp plate is then moved away from the drawing plate, held securely to the drawing plate support block, causing the wire to be drawn through the drawing plate.

The clasp plate is slidably supported by one or more, typically two, support rods extending from the draw plate support block to a motor support block. Mounted parallel to the support rods and passing through a threaded hole in the clasp plate with threads matching the threaded rod is a threaded rod. Thus, when the threaded rod is rotated, the clasp plate moves longitudinally on the support rods and the threaded rod. The threaded rod passes through a hole in the motor support block to a motor drive shaft, connected to the shaft by means of an adjustable shaft that drives the threaded rod under normal resistive load from the wire but slides, disengaging the motor from the threaded rod, during high resistive loads. The clutch is adjustable to accommodate wire of various sizes and materials.

DESCRIPTION OF THE PREFERRED EMBODIMENT

Referring to the figures, the present invention in its usual configuration comprises a draw plate mounting block 10, a motor mounting block 20, two parallel support rods 30 between and supported by the draw plate mounting block 10 and the motor mounting block 20, a threaded rod 40 parallel to the support rods 30, a clasp plate 50 having two clasp plate holes 51 through which slidably pass support rods 30 and also having a threaded hole 52 through which the matching threaded rod 40 passes, and motor 60 mounted to motor mounting block 20, and a base 70 to which the mounting blocks 10 and 20 may be secured.

The draw plate mounting block it has a bearing 11 mounted therein to which the threaded rod 40 is attached, allowing the rod 40 to freely spin while being supported by the draw plate mounting block 10. It also has a channel 12 through which wire passes from a draw plate 80 to the clasp plate 50. To the side of the draw plate mounting block 10 opposite the support and threaded rods is a draw plate clasp 13 with spring bias for holding a draw plate 80 to the draw plate mounting block 10. The draw plate clasp 13 comprises a plate 14 generally matching the draw plate mounting block side to which it attaches, extending along the block side bottom away from the block 10 and then resiliently biased toward the block side defining a recess 15 between the plate 14 and the side, forming the clasp 13. The recess 15 thus formed typically describes the general shape of a triangle so that plates of various sizes and shapes can be firmly held by the clasp without sliding. A draw plate 80 is then received between the clasp 13 and the block 10 near the clasp bottom and again engaged by the clasp 13 near the clasp top forming two lines of contact by the clasp plate 14 biasing the draw plate against the block 10 in a snug frictional fit.

The motor mounting block 20 has a rod support plate 21 to which the support rods 30 attach and a rod support plate hole 22 through which the threaded rod 40 passes. It further has a motor support plate 23 to which the motor 60, typically a variable speed hand drill motor with drive shaft (not shown), is mounted. The support plates 21 and 23 are spaced apart by a support plate base 24 to which they are attached. The motor support plate 23 comprises a lower half plate 25 with a half cylindrical channel 26 and a upper half plate 27 attached thereto with a matching half cylindrical channel 28 such that together the channels form a cylindrical hole through the motor support plate 23 through which the motor passes and is clamped by the half plates. The upper plate 26 is typically mounted to the lower plate with conventional screws 29.

Mounted on the clasp plate 50 is an adjustable clasp 53 for securing wire stock of various sizes and metals of differing hardness. The clasp 53 comprises opposing jaws which close on the wire stock which may be spring or tension loaded and releasable as in the normal manner of adjustable locking pliers, for example, as manufactured by Vise-Grip TM and other manufacturers.

To the motor drive shaft is attached a clutch mechanism 100 comprising a clutch base 101 attached to the motor drive shaft, a clutch tube 102 attached to the clutch base 101 and extending from the clutch base 101 concentric with the motor drive shaft, and an adjustable clutch ring 103 around the clutch tube 102 near the tube end. The clutch tube 102 has diametrically opposed longitudinal slots 104 extending to its end. In operation, the threaded rod 40 is inserted in the clutch tube 102. The clutch ring 103 is tightened around the clutch 102 tube causing the tube to cinch down on the threaded rod 40. The ring 103 is not firmly tightened, however, thereby allowing the threaded rod 40 to be turned by the clutch tube under normal load, but also allowing the threaded rod 40 to slip in the tube under excessive load. Thus, when adjusted properly, the rod rotates with the motor drive while normally drawing wire but will slip in the tube if resistance increases and threatens to break the wire.

In operation, wire stock 90 passes through the draw plate clasp 13, through a selected hole in the draw plate 80, through the channel 12 in the draw plate mounting block 10 to the clasp plate 50 where it is attached. When the motor is energized, the threaded rod 40 rotates causing the clasp plate 50 to move longitudinally on the support rods 30. As the clasp plate 50 moves away from the draw plate mounting rod 10, wire stock is drawn through draw plate 80 forming wire of the size prescribed by the draw plate 80.

Having described the invention, what is claimed is:

1. A wire drawing machine with an electric motor with only a single drive shaft, comprising
   a motor mounting block comprising
      a motor support base having a first and a second end,
      a rod support plate with a horizontal hole therethrough mounted on the support base first end,
      a motor support plate mounted on the support base second end to which the motor is mounted with the motor drive shaft directed toward and in line with the horizontal hole of the rod support plate, and
      means to mount the motor to the motor support plate,
   a clasp plate having one or more parallel horizontal support rod holes therethrough separated by a parallel horizontal threaded hole,
   a clasp on the clasp plate for grasping wire,
   a draw plate through which wire stock may be drawn,
   a draw plate mounting block oriented vertically with a front face and a back face opposite the front face with the draw plate mounted on the front face and the back face oriented toward the clasp plate and having a recess therein suitable for mounting a bearing and further having a channel through which a wire may pass on a line from the draw plate to the clasp plate,
   a bearing mounted in the draw plate mounting block recess,
   one or more support rods having first and second ends non-rotatively attached to the draw plate mounting block on a first end and the motor mounting block rod support plate on a second end and passing through the support rod holes of the clasp plate parallel to the wire line from the draw plate to the clasp plate,
   a threaded rod rotatably mounted in the bearing in the draw plate mounting block and threaded through the clasp plate threaded hole parallel to the one or more support rods and passing through the motor mounting block rod support plate hole to the motor drive shaft,
   means for connecting the motor drive shaft to the threaded rod
   such that when the motor drive shaft turns the threaded rod, the clasp plate travels on the one or more support rods passing through the clasp plate.

2. The invention of claim 1 further comprising a draw plate clasp secured to the front face of the draw plate mounting block for supporting a draw plate in which the clasp o the clasp plate is spring or tension loaded and releasable.

3. The invention of claim 1 wherein the clasp on the plate clasp is adjustable for securing wire stock of various sizes and metals of differing hardness and comprises opposing jaws which close on the wire stock.

4. The invention of claim 2 wherein the draw plate clasp further comprises a plate generally matching the draw plate mounting block front face to which it attaches at the block bottom, extending away from the block and then resiliently biased back toward the block defining a generally triangular recess between the plate and the side.

5. The invention of claim 1 wherein the motor with drive shaft is a variable speed hand drill motor with drive.

6. A wire drawing machine with an electric motor with only a single drive shaft, comprising
   a motor mounting block comprising
      a motor support base having a first and a second end,
      a rod support plate with a horizontal hole therethrough mounted on the support base first end,
      a motor support plate mounted on the support base second end to which the motor is mounted with the motor drive shaft directed toward and in line with the horizontal hole of the rod support plate, and means to mount the motor to the motor support plate, a clasp plate having one or more parallel horizontal support rod holes therethrough separated by a parallel horizontal threaded hole, a clasp on the clasp plate for grasping wire, a draw plate through which wire stock may be drawn, a draw plate mounting block oriented vertically with a front face and a back face opposite the front face with the draw plate mounted on the front face and the back face oriented toward the clasp plate and having a recess therein suitable for mounting a bearing and further having a channel through which a wire may pas on a line from the draw plate to the clasp plate, a bearing mounted in the draw plate mounting block recess, one or more support rods having first and second ends non-rotatively attached to the draw plate mounting block on a first end and the motor mounting block rod support plate on a second end and passing through the support rod holes of the clasp plate parallel to the wire line from the draw plate to the clasp plate, a threaded rod rotatably mounted in the bearing in the draw plate mounting block and threaded through the clasp plate threaded hole parallel to the one or more support rods and passing through the motor mounting block rod support plate hole to the motor drive shaft, an adjustable clutch connecting the motor drive shaft to the threaded rod allowing the threaded rod to disengage from the motor drive under high load conditions such that when the motor drive shaft turns the threaded rod, the clasp plate travels on the one or more support rods passing through the clasp plate.

7. The invention of claim 6 wherein the adjustable clutch comprises a clutch base attached to the motor drive shaft, a clutch tube attached to the clutch base and extending from the clutch base concentric with the motor drive shaft, and having diametrically opposed longitudinal slots extending to its end, an adjustable clutch ring around the clutch tube near the tube end which can be variably tightened around the clutch tube causing the tube to releasably tighten on the threaded rod such that under normal load the threaded rod is rotated by the motor but under excessive load the threaded rod slips in the clutch tube.

8. The method of drawing wire using a machine having a motor mounting block with a hole therethrough, a draw plate mounting block having a channel through which a wire may pass, a clasp plate having a threaded hole, a clasp on the clasp plate for grasping wire, one or more support rods between and supported by the draw plate mounting block and the motor mounting block, a threaded rod pass through the clasp plate thread hole parallel to the support rods and extending from the draw plate mounting block through the motor mounting block hole with rod threads matching the clasp plate threaded hole, means for supporting the threaded rod rotatably in the draw plate mounting block, means for turning the threaded rod, comprising the following steps:

a. passing wire stock through a hole of a draw plate, b. mounting the draw plate to the mounting block with the wire stock guided through the draw plate channel mounting block to the clasp plate clasp, c. attaching the wire stock to the clasp plate clasp, d. turning the threaded rod causing the clasp plate to move longitudinally on the support rods away from the draw plate mounting rod, drawing the wire stock through the draw plate thereby forming wire of the size prescribed by the draw plate wherein the threaded rod is turned by a motor connected to the threaded rod by means of an adjustable tube around the threaded rod for regulating the frictional connection of the tube to the threaded rod, thereby forming a slipping clutch that causes the threaded rod to rotate under normal resistive load from the wire but releases and slips between the tube and the threaded rod under excessive resistive load.

* * * * *